United States Patent Office 3,457,875
Patented July 29, 1969

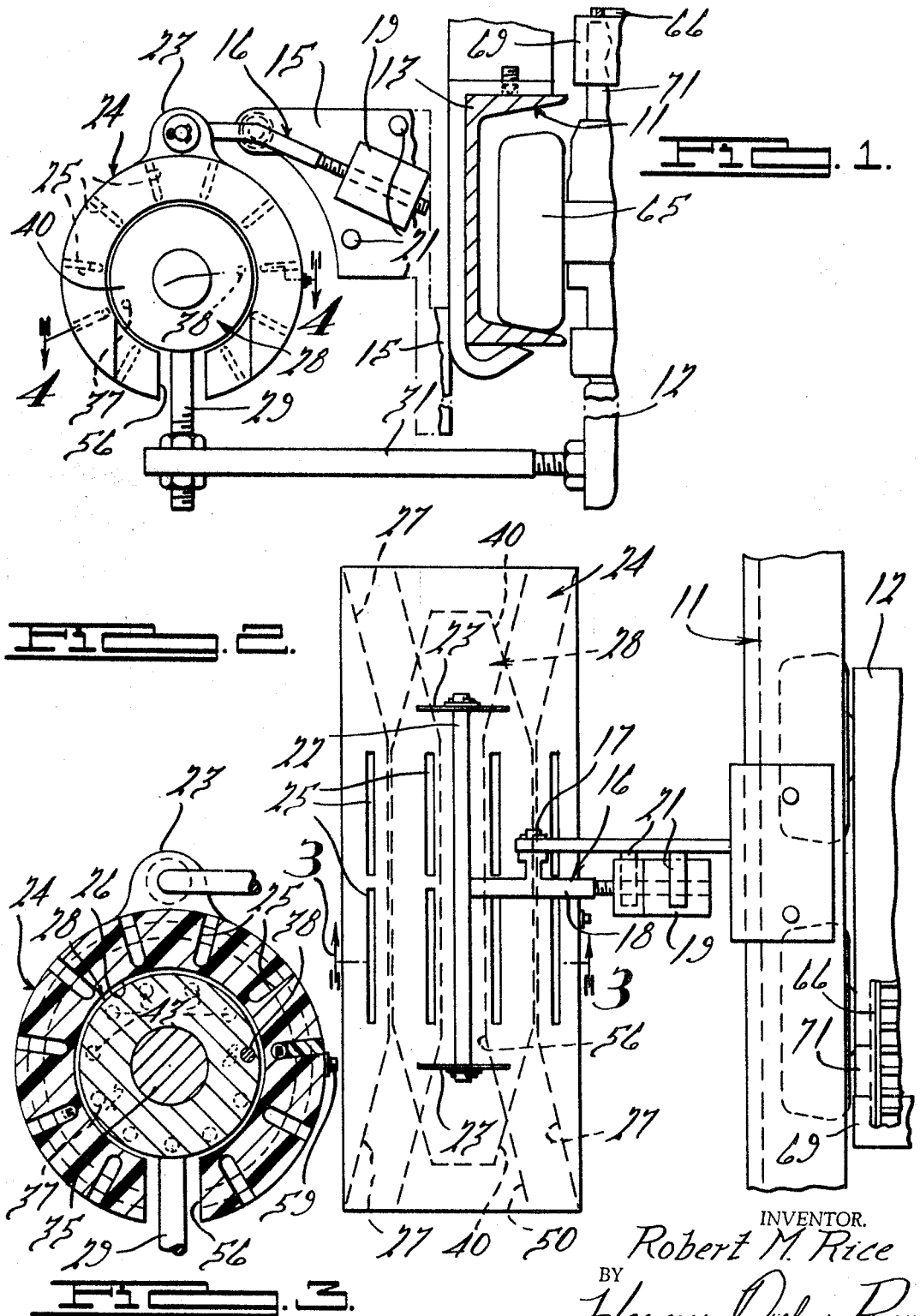

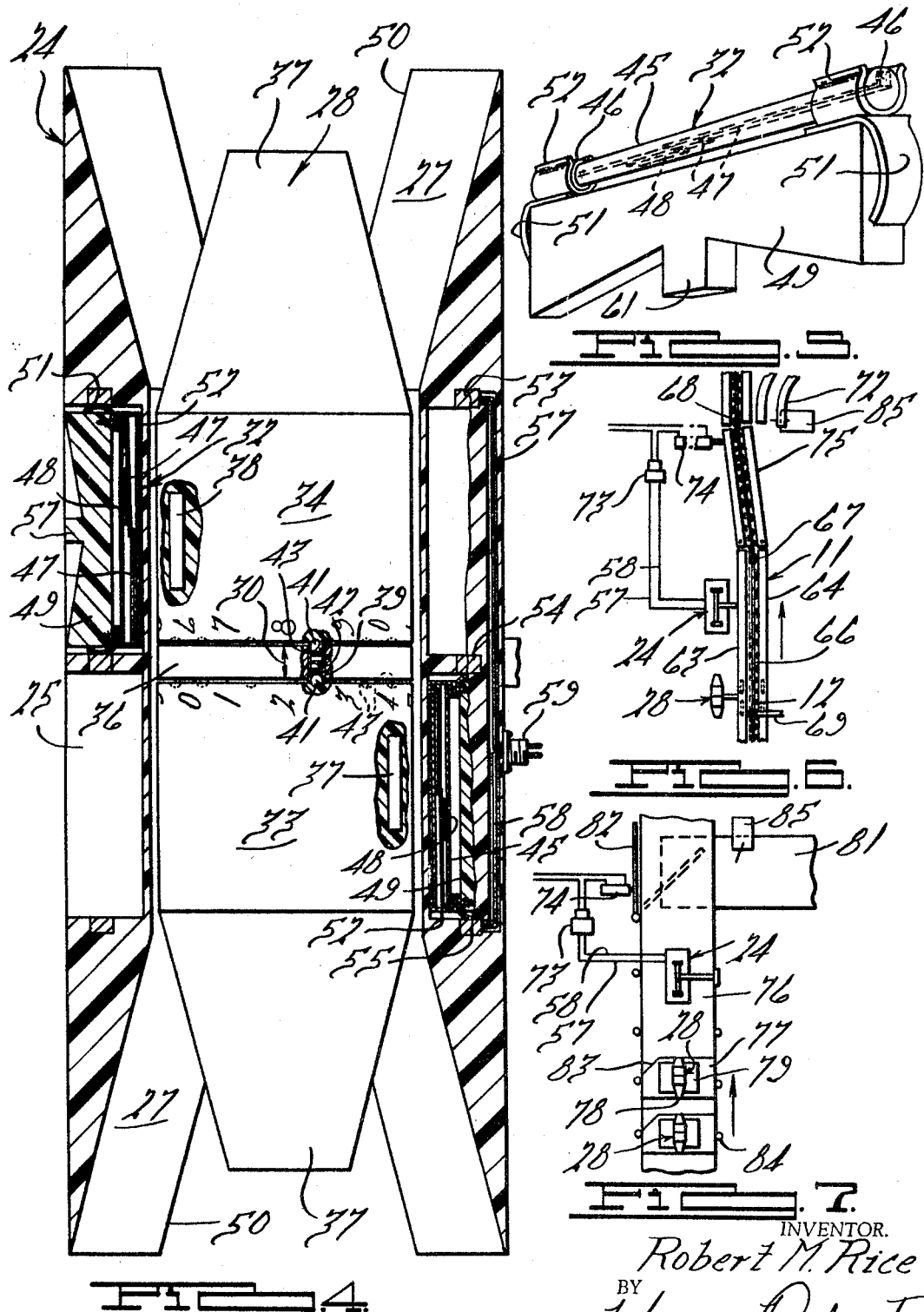

3,457,875
CONVEYOR MULTIPLE STATION CONTROL
Robert M. Rice, Windsor, Ontario, Canada, assignor to McInnis Conveyors Limited, Windsor, Ontario, Canada, a company of Ontario
Filed Mar. 3, 1967, Ser. No. 620,353
Int. Cl. B61j 3/04; B61b 13/04; B61l 11/00
U.S. Cl. 104—88                    6 Claims

ABSTRACT OF THE DISCLOSURE

Any type of conveyor system may be controlled by the present sensing system for delivering an article from any one station to any other of a multiplicity of stations. Each station has an actuator with a different setting from another station and each carrier of the conveyor has a selector which may be adjusted to the setting of the station to which an article is to be delivered.

This invention relates to conveyor systems and particularly to a sensing system for delivering articles being conveyed to a specific one of a plurality of stations.

Background of the invention

The field of the invention pertains to any type of conveying systems such as chain, belt, car and the like, which advances the article along the conveying path. The carrier and the article will be delivered to the station automatically by the actuation of the mechanisms at the station which shunts the carrier and the article from the conveyor path.

In the prior art, an overhead conveyor chain was employed along a work line on which articles to be used at different stations were suspended. As the article reaches the station where it is to be employed, it is manually removed or carried around the conveyor path so as to be available at the station when it again passes thereby. Wheeled carriers have been employed on tracks which are shuttled therefrom at any particular station when matching elements engage each other and directly operate a switch in the track system.

Summary

The present invention is believed to provide a substantial advance in the art of controlling the delivery of articles from a complex conveyor system to a specific one of a multiplicity of stations. Each station has an actuator containing responsive elements which are differently related at each of the multiplicity of stations. A selector is supported on each carrier of the conveyor system in alignment with the actuators at each station. Each selector is adjusted to have the sensing elements in position to actuate the energizable devices of the actuator at the particular station to which the article is to be delivered. The selectors move into alignment with the actuators at the stations and when aligned with the actuator at the station to which the article is to be delivered, the responsive elements thereof are actuated to operate a switch, a valve or the like, to provide energy to shunt an article from the conveying system to a station. A limit switch is employed for returning the shunting means to its initial position so that the next article will pass by the station if it is not to be delivered thereto. With this arrangement, an article may be inserted into the conveyor system at any point and be delivered to any one of a multiplicity of stations. It is the main object of the invention to simplify the automatic delivery of a large number of articles to any one of a large number of stations along a conveyor system.

Brief description of the drawings

FIG. 1 is a broken, sectional view in elevation of a conveyor system having a selector thereon shown in conjunction with an actuator located ahead of a receiving station which embodies features of the present invention;

FIG. 2 is a plan view of the structure illustrated in FIG. 1;

FIG. 3 is an enlarged sectional view of the structure illustrated in FIG. 2, taken on the lines 3—3 thereof;

FIG. 4 is an enlarged broken sectional view of the structure illustrated in FIG. 1, taken on the line 4—4 thereof;

FIG. 5 is an enlarged perspective view of a responsive element employed in the device illustrated in FIG. 4;

FIG. 6 is a schematic view of a station in an overhead conveyor; and

FIG. 7 is a broken plan view of a station positioned adjacent to a belt-type of conveyor.

Description of preferred embodiment

In FIGS. 1 to 5, a conveyor system 11 is illustrated which supports carriers 12 on rails 13 that are engaged by spaced pick up elements 69 on a driven chain 66. The bars advance the carriers at a predetermined speed and permit them to be separated therefrom at a station and to be picked up thereby when being added to the conveyor. Ahead of each station, the conveyor 11 carries a bracket 15 upon which a T-shaped arm 16 is secured by a pivot 17. The bracket 15 and carrier 12 are shown broken to permit the parts supported on the carrier to pass below the rails 13 when shifted from the conveyor at a station. The leg 18 from which the pivot 17 extends, carries a weight 19 which is threaded thereon for adjustment lengthwise thereof. The bracket has two extending arms 21 located on opposite sides of the weight 19 for limiting its movement. The cross element 22 on the leg 18 is pivotally supported on inserts 23 which are embedded in the plastic material of the body of an actuator 24. The body has circumferential rows of aligned slots 25 equally spaced around the body outwardly of a large central opening 26, the surface of which is spaced a short distance from the bottom of slots 25. The ends of the cylindrical opening 26 flare outwardly to form conical surfaces 27 for guiding a selector 28 into the opening 26, as illustrated in FIG. 3. The actuator 24 is swingable on the bracket 15 and arm 16 to permit the alignment of the selector 28 therewith. The selector 28 is mounted on a stud 29 and is adjustably secured on an arm 31 which is attached to each carrier 12.

The actuator 24 has two responsive elements 32, one mounted in each of the circumferential rows of slots 25. The elements are responsive to a force such as air which opens or closes an orifice, heat for operating a bimetallic or other heat sensitive element, light for operating a photocell, electric for bridging contacts with a conductor, magnetic for directly operating switches or mechanical for operating a spring pressed switch arm. While these and other types of sensing and responsive devices could be employed, for the purpose of illustration, the magnetic type is shown and described in detail.

The magnetically actuated responsive element 32 has switch arms which are moved to engaged position by magnets carried by a pair of rotors 33 and 34 of the selector 28. The selector has a shaft 35 which supports a central partition 36 and truncated conical guiding ends 37 between which the rotors are rotatably supported. The rotor 33 carries a permanent magnet 37 and the rotor 34 carries a similar magnet 38. The partition 36 carries a sleeve 39 with a ball 41 at each end urged outwardly by a central spring 42. The balls engage notches 43 on the adjacent ends of the rotors 33 and 34 spaced apart to fall on the radii of the slots 25 of the actuator 24 so as to locate the magnets 37 and 38 in alignment with a pair of slots and for retaining the rotors 33 and 34, in selected rotated positions. It will be noted that the rotors 33 and 34 have numbers 0 to 9 thereon adjacent to the partition 36 and that the numbers 2 and 8 have been set adjacent to a mark 30 thereon. The two responsive elements 32 of the actuator 24 at the station 2-8 will respond to the magnets resulting in the delivery of an article on a carrier 12 to the station 2-8.

The actuators 24 have the responsive elements 32 located at the number for the station and will be responsive to the selector which has the magnets adjusted for that station. In the arrangement illustrated, the responsive element 32 embodies a cylindrical tube 45 made of insulating material having metal caps 46 at each end. Each cap has a conducting switch arm 47, as illustrated in FIG. 4, the one arm having a magnetic responsive strip 48 thereon which draws the arms 47 into contact with the other arms to complete a circuit. When the switch arms are made of magnetically responsive material, the end contacts will be drawn together to complete a circuit when the magnet passes thereby. As illustrated in FIG. 5, a receptacle 49 for the responsive element 32 is made of insulating material and provided with contact clips 51 on the ends to which pronged members 52 are conductively joined. The prongs of the members receive the caps 46 which place the responsive element 32 in series with the clips 51. As illustrated in FIG. 4, conducting rings 53, 54 and 55 are embedded in the plastic material of the body of the actuator 24, with a face exposed at the ends of the slots 25. The receptacle 49 is received in a selected one of the slots 25 in each of the circumferential rows to conform to the number of the station at which the actuator is supported.

Referring to FIG. 3, it will be noted that ten circumferential slots 25 are provided in two different rows spaced equal angularly distances apart except at the bottom where a through slot 56 is located to permit the stud 29 to pass therethrough. Since ten equal angular spaces are provided by the slots 25, the magnets 37 and 38 can be shifted equal angular distances to be in alignment with the slots selected. When the slot 56 is so located as to be spaced the same angular distance from the two adjacent slots 25, as illustrated in FIG. 3, a notch 43 is provided thereat so that the rotors 33 will have eleven equiangular positions. This will provide a condition in which the magnets 37 and 38 can be aligned with the slot 56 and none of the actuators 24 will be operated. This is desirable when the conveyor is being tested and the maximum stations are being employed.

For the station 2-8 it will be noticed that a receptacle 49 has been placed in the slot 25 numbered 8 of the rotor 34 and in the slot 25 numbered 2 in the rotor 33. When a receptacle 49 is placed within a slot 25 the clips 51 connects the responsive elements 32 in series relation to each other. With this arrangement, conductors 57 and 58 joined respectively to the rings 53 and 55 will have a circuit completed when the arms 47 of both responsive elements 32 are in engagement with each other. This engagement will be produced when the magnets 37 and 38 pass adjacent to the responsive elements simultaneously as clearly illustrated in FIG. 4 during the passage of the selector 28 through the actuator 24. The contact will be broken by the movement of the arms 47 away from each other as the magnets 37 and 38 are carried beyond the slots 25. The conductors 57 and 58 are joined to a jack type socket 59 so that the circuit to the control panel for the operating means at the station may be fixedly secured thereto with the ends of the conductors in firm fixed relation to each other to prevent accidental separation. The receptacle 49 has a lug 61 on the outer side which may be grasped by the fingers or the jaws of a plier to permit the ready insertion and removal of the receptacle 49 and te responsive element 32 to conform to the number of a station. By numbering the stop positions of the selector 28 in accordance with the ten or eleven recesses 43 which are provided and by correspondingly numbering the slots 25 in the two rows thereof any number up to 100 may be set for any number of stations up to that number.

If 8-2 instead of 2-8 is to be set on the actuator for a station 8-2, the receptacle 49 in the slot 2 adjacent to the rotor 33 would be moved to the slot 8 thereof. The receptacle 49 in the slot 8 adjacent to the rotor 34 would be moved to the slot 2 thereof. This would set up the actuator 24 to numbers 8 and 2 on the selector 28 for the station 8-2. When an article is to be delivered to this station, the selector 28 on the carriage has the rotor 33 advanced to have the numeral 8 located adjacent to the mark 30 and the rotor 34 advanced to have the numeral 2 located adjacent to the mark. This locates the magnets 37 and 38 in position to simultaneously operate the responsive elements 32 in the 8 and 2 slots 25 which will complete a circuit and deliver the article to the station 8-2. In this manner the actuators can be set for any number station having two digits which are different from the digits at another station and the actuator may have the rotors 33 and 34 set at a number to correspond to the number of the station where delivery is to be made.

It is to be understood that the selector and actuator may control more than the mentioned 100 stations by reducing the angular spacing of the slots 25, by increasing the diameter of the seltctor and actuator so that more slots can be provided and by using additional rotors and circumferential rows of slots so that three, four or more of the responsive elements 32 must be placed in series to complete a circuit to the station operating device. Thus, hundreds of stations may be controlled by the use of the actuator 24 located ahead of the stations and by the attachment of the selector 28 to the carrier for the article to be delivered. With this arrangement, an article could be placed in the conveyor system at any point and directed to any station in the system where it will be automatically delivered.

In FIG. 6, a schematic arrangement is illustrated for producing the automatic delivery of articles from a conveyor system 11. This system embodies a pair of facing channels 63 and 64 on which four rollers 65 of the carriers 12 roll. A continuously operated chain 66 is guided on sprocket wheels 67 and 68 above the channels. Pickup elements 69 on the chain engage upwardly extending bosses 71 on each carrier 12. The elements 69 are spaced equal distances apart on the chain to provide intervals in which the carriages may be moved from a conveyor section to the station and from the station back onto the main conveyor where it will be picked up by the next advancing element 69. The carriage 12 having an article to be delivered to the station will be moved on to a conveyor section 72 when the actuator 24 responds to the force of the magnets 37, 38 of the selector 28 to complete a circuit to a relay 73. The relay energizes a solenoid 74 which moves a pivoted section 75 of the conveyor into alignment with the section 72 onto which the carriage is shunted. The relay is then deenergized by a limit switch 85 to return the section 75 back to its position in the main conveyor system in time to have the next carriage pass thereover if the next article is not to be delivered to the station. A carrier may be moved from the section 72 onto the section 75 when operated manually to return the carrier to the conveyor system ahead of a pickup element 69 which advances it therealong. It is to be understood that actuator 24 and selector 28 are mounted below the rails 13 to permit the movement of the section 25.

A further example of conveyor system is illustrated in FIG. 7 where a belt 76 is driven to advance platforms 77 therewith. Each platform has an upright 78 which carries a selector 28 located above an article 79 carried by the platform. A station is illustrated where a continuously driven belt 81 is disposed at right angle to and beneath the belt 76 in position to receive one of the platforms 77.

When a selector 28 passes through the actuator 24 at the station and causes the circuits 57, 58 to be completed, the relay 73 will be energized. The relay will cause the solenoid 74 to be actuated which will move a blade 82 outwardly at a 45° angle across the belt 76 where it will be engaged by a sloping corner 83 of the platform 27 as it advances thereagain to move the platform at right angles until the opposite end engages the belt 81 and moves it from the belt 76. The relay 73 will open the circuit to the solenoid 74 and permit the blade 82 to swing backwardly to its inoperative position along the edge of the belt when limit switch 85 is tripped. Rollers 84 may be provided at each edge of the belt 76 to have the selectors 28 accurately aligned with the actuators 24 so as to permit the selectors to pass therethrough in a manner as pointed out hereinabove. The platforms may have wheels thereon which run in tracks to be advanced by chains to a station having a switch spur which will be thrown to shunt the wheels of the platform to a spur when the actuator completes the circuit to a switch operating mechanism. In this manner the selector system is versatile since it may be applied to any type of conveyor system for delivering articles to stations located therealong.

What is claimed is:

1. In a conveyor system, a conveyor for moving articles in a predetermined path, stations along the path of said conveyor for receiving articles carried thereby, carriers for articles on said conveyor, means for advancing said carriers to said stations, a selector supported on each carrier, said selector having a pair of axially disposed rotatable rotors, a magnet in each rotor which is angularly positioned by the adjustment of the rotors to conform to a station, an actuator at each station, and magnetically actuated switches longitudinally spaced and selectively angularly positioned to identify a station and to be operated by the angularly positioned magnets of a selector set for that station when the selector and actuator are in proximity to each other.

2. In a conveyor system as recited in claim 1, wherein the stations are numbered in accordance with the position of the switches in the actuator thereat, and the rotors have numbers for locating the magnet therein which permits the rotors to be adjusted to any number for any numbered station.

3. In a conveyor system as recited in claim 1, wherein the actuator is a tube provided with a plurality of circumferential recesses and a lengthwise slot, conducting means at the ends of the recesses, a receptacle for said switches removably secured in one of said recesses in engagement with said conducting means, said selector being of cylindrical form to pass through the actuator tube.

4. In a conveyor system as recited in claim 1, wherein said actuator has a plurality of rows of circumferential recesses with a switch in each row, and wherein a plurality of rotors are carried by the selector one for each said circumferential row of recesses the magnets of which when properly positioned actuate switches selectively located at a station and complete a circuit for operating a transfer or unloading device at the station.

5. In a conveyor system as recited in claim 4, wherein the actuator is a slotted tube having a large central opening containing said switches which are disposed adjacent to the inner surface of the opening, and wherein the selector passes through the tube with the magnets on the rotors disposed adjacent to the outer surface thereof which activate the switches to produce their simultaneous operation when positioned adjacent thereto and set to conform therewith.

6. In a conveyor as recited in claim 5 wherein said switches are connected in a series circuit which is completed upon the simultaneous actuation thereof.

References Cited

UNITED STATES PATENTS

| | | | |
|---|---|---|---|
| 2,320,150 | 5/1943 | Loughridge | 104—88 |
| 2,835,206 | 5/1958 | Gordon | 104—88 |
| 2,850,249 | 9/1958 | Uderstadt | 104—88 |
| 3,157,270 | 11/1964 | Prucha | 104—88 |
| 3,158,710 | 11/1964 | Paglee | 104—88 |
| 3,200,933 | 8/1965 | Schenk | 104—88 |

ARTHUR L. LA POINT, Primary Examiner

D. F. WORTH III, Assistant Examiner

U.S. Cl. X.R.

104—172